US012711019B2

(12) United States Patent
Teli et al.

(10) Patent No.: US 12,711,019 B2
(45) Date of Patent: Aug. 18, 2026

(54) SHUTDOWN AND RESTART MANAGEMENT IN A DISTRIBUTED COMPUTING ENVIRONMENT

(71) Applicant: Honeywell International Inc., Charlotte, NC (US)

(72) Inventors: Faizan Bashir Teli, Srinagar (IN); McMillan Goyal, Bengaluru (IN); Sham Sharma, Atlanta, GA (US); Debabrata Palai, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 74 days.

(21) Appl. No.: 18/816,405

(22) Filed: Aug. 27, 2024

(65) Prior Publication Data

US 2026/0064540 A1 Mar. 5, 2026

(51) Int. Cl.
*G06F 11/1446* (2026.01)
*G06F 11/14* (2026.01)

(52) U.S. Cl.
CPC ...... *G06F 11/1464* (2013.01); *G06F 11/1438* (2013.01); *G06F 11/1469* (2013.01)

(58) Field of Classification Search
None
See application file for complete search history.

(56) References Cited

U.S. PATENT DOCUMENTS

| | | | | |
|---|---|---|---|---|
| 11,089,092 | B1 * | 8/2021 | Seibel | H04L 41/0816 |
| 11,507,466 | B2 * | 11/2022 | Balcha | G06F 11/1451 |
| 2017/0083367 | A1 * | 3/2017 | Chen | G06F 9/5022 |
| 2019/0130114 | A1 * | 5/2019 | Smith | G06F 21/10 |
| 2020/0110625 | A1 * | 4/2020 | Warnicke | G06F 9/5083 |
| 2020/0244721 | A1 | 7/2020 | S et al. | |
| 2022/0318052 | A1 * | 10/2022 | Sivathanu | G06F 9/5088 |
| 2023/0099014 | A1 * | 3/2023 | Sagiraju | G06F 11/1464 714/6.12 |
| 2023/0259409 | A1 * | 8/2023 | Shi | G06F 9/5077 718/104 |

OTHER PUBLICATIONS

"Kubernetes Scheduling with Checkpoint/Restore: Challenges and Open Problems"; Viktória Spišaková; Radostin Stoyanov; Lukáš Hejtmánek; Dalibor Klusáček; Adrian Reber; and Rodrigo Bruno; Job Scheduling Strategies for Parallel Processing. Springer Nature Switzerland (2025). (Year: 2025).*

* cited by examiner

*Primary Examiner* — Michael Alsip
(74) *Attorney, Agent, or Firm* — Alston & Bird LLP

(57) ABSTRACT

Devices, methods, and systems for shutdown and restart management in a distributed computing environment are described herein. One method includes determining whether a backup of a workload in a distributed computing environment exists, causing a shutdown sequence of the workload to occur at a first predetermined time to shut down the workload, and causing a restart sequence of the workload to occur to restart the workload in the distributed computing environment.

17 Claims, 6 Drawing Sheets

SHUTDOWN AND RESTART MANAGEMENT IN A DISTRIBUTED COMPUTING ENVIRONMENT

TECHNICAL FIELD

The present disclosure relates generally to devices, methods, and systems for shutdown and restart management in a distributed computing environment.

BACKGROUND

A distributed computing environment can include various computing resources. Such computing resources can be comprised of computing systems having inter-communicating components which can be located on different networked computing systems. The computing resources in the distributed computing environment and/or other services may be provisioned in order to deploy workloads.

A distributed computing environment may be utilized to deploy a particular workload requested by a client. For instance, computing resources in a cloud infrastructure, private data center, and/or bare metal servers may be examples of distributed computing environments utilized to deploy a particular workload, among other computing resource environments.

DETAILED DESCRIPTION

Figure 1:
FIG. 1 illustrates a block diagram of an example of a system for shutdown and restart management in a distributed computing environment in accordance with one or more embodiments.
Figure 1:
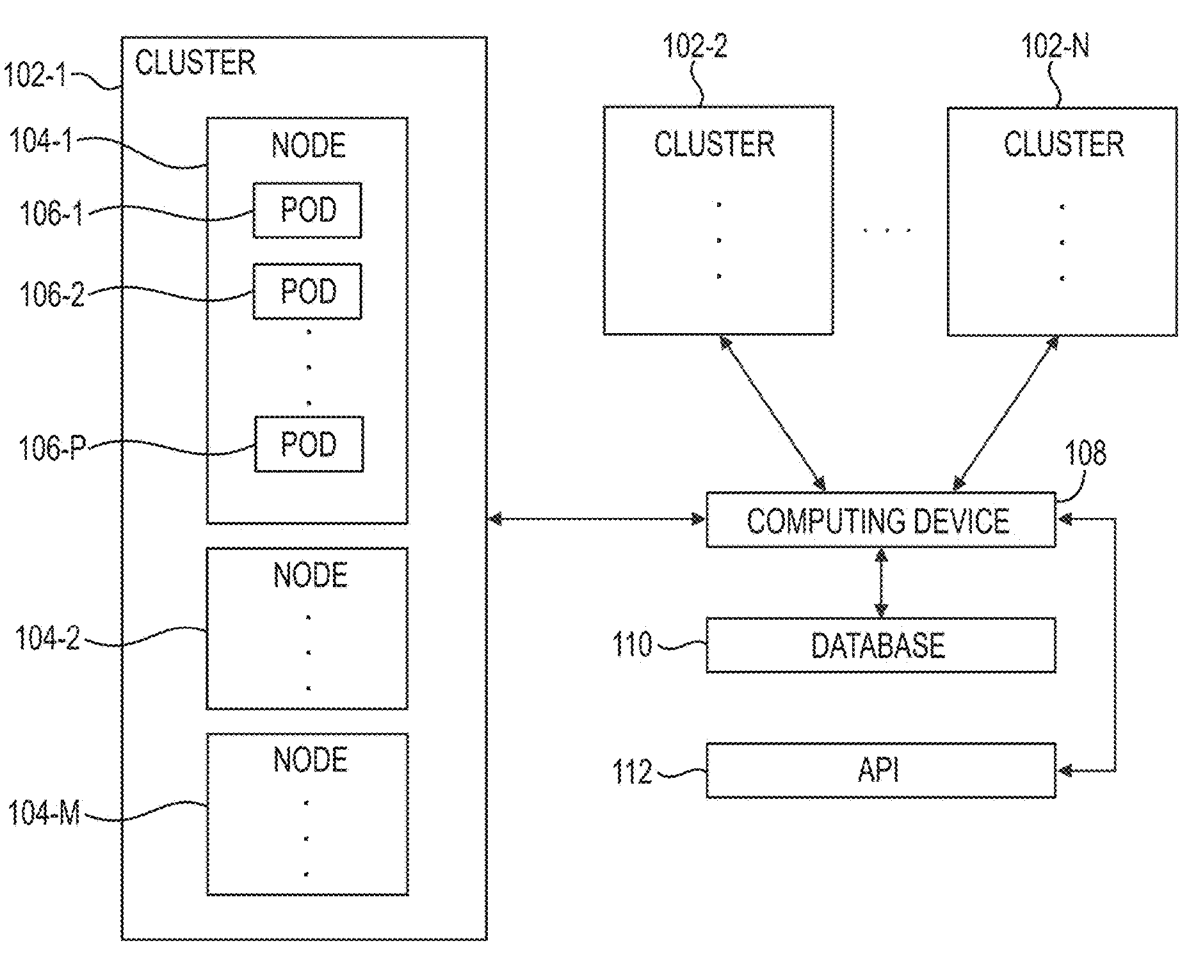

Devices, methods, and systems for shutdown and restart management in a distributed computing environment are described herein. One method includes determining whether a backup of a workload in a distributed computing environment exists, causing a shutdown sequence of the workload to occur at a first predetermined time to shut down the workload, and causing a restart sequence of the workload to occur to restart the workload in the distributed computing environment.

As mentioned above, a distributed computing environment may be utilized to deploy a workload. A workload can be, for example, a set of computational tasks. For example, a workload can include an application, service, or other set of computational tasks that can be run using computing resources provisioned from the distributed computing environment.

A distributed computing environment may be shared by multiple different workloads. For example, multiple users may provision different computing resources within the distributed computing environment to deploy different workloads using the distributed computing environment.

However, there may be times at which the workloads are not efficiently using the deployed resources within the distributed computing environment. For example, workloads may utilize fewer computing resources during specific times as compared with other times. These specific times may be times outside typical business hours in a workday, during weekends, during holidays, etc. For instance, a workload may utilize fewer computing resources in the distributed computing environment over the weekend, as compared with during business hours on a weekday.

An automated shutdown and restart management sequences in a distributed computing environment, as described herein, can conserve resources in the distributed computing environment by allowing for efficient and reliable management of shutdown and restart protocols in the distributed computing environment. For instance, at certain times, it can be useful to conserve resources of the distributed computing environment by shutting down resources in the distributed computing environment, such as during a weekend or holiday, according to a shutdown sequence. Once the shutdown period is over, those resources can be restarted for use.

For example, a backup sequence can be used to generate a backup of a workload in a distributed computing environment. Once the backup of the workload is generated and it has been confirmed the workload has been backed up, the workload can be shut down via a shutdown sequence for a period of time. The shutdown sequence can include determining whether the workload has an exemption, and if so, can refrain from shutting down the workload. If no exemption exists, the workload can be shut down at a first predetermined time and restarted at a second predetermined time (e.g., after the period of time expires) according to a restart sequence. Alerts can be generated regarding the status and/or success or failure of the shutdown and restart. These automated protocols can allow for workloads to be shut down during particular time periods without manual intervention, while also allowing for certain (e.g., business critical) workloads to be exempt from the shutdown and restart sequences, providing for flexibility for certain workloads in the distributed computing environment. Further, these automated protocols can prevent errors from occurring during the shut down process and ensure a smooth restart.

Such an approach can allow for more efficient uses of resources in a distributed computing environment by preventing resource conflict, while also ensuring integrity of data through backup processes and minimizing workload downtime, as compared with previous approaches. For instance, such an approach can preserve computing resources during the time period when the workload is shut down, as the workload may not be being utilized, resulting in cost savings as compared with not shutting down the workload.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 508 in FIG. 5.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of an example of a system 100 for shutdown and restart management in a distributed computing environment in accordance with one or more embodiments. The system 100 can include clusters 102-1, 102-2, . . . , 102-N, a computing device 108, a database 110, and an application programming interface (API) 112.

As mentioned above, a distributed computing environment may be utilized to deploy a workload or multiple workloads. Such a distributed computing environment can be represented by the system 100 illustrated in FIG. 1. For example, the system 100 can be a distributed computing environment that can operate to deploy various workloads within the system 100. Examples of workloads can include executing applications or services, hosting databases, processing of data, etc.

The distributed computing environment of the system 100 can be, for example, a Kubernetes environment. A Kubernetes environment can be, for example, a computing orchestration system for workload deployment, scaling, and management.

The system 100 can include clusters 102-1, 102-2, . . . , 102-N. As used herein, a cluster refers to a set of containerized nodes configured to run computing workloads and/or services. For example, as illustrated in FIG. 1, the cluster 102-1 can include nodes 104-1, 104-2, 104-M. As used herein, a node refers to a computing resource that is configured to run a workload. The nodes 104-1, 104-2, 104-M can be, for example, physical machines or virtual machines that can run workloads within the cluster 102-1.

Within the nodes 104-1, 104-2, . . . , 104-M, the system 100 can further include pods 106-1, 106-2, . . . , 106-P. As used herein, a pod refers to a cluster deployment unit that includes one or more containers. A container refers to a self-contained software package including everything to run an application, such as code, runtime, application and system libraries, default values for settings, etc. For example, a workload can be run on a pod 106-1 of a node 104-1 included in a cluster 102-1 in a Kubernetes environment as illustrated in the system 100 of FIG. 1.

As mentioned above, examples of workloads can include executing applications or services, hosting databases, processing of data, etc. One example of a workload in the system 100 can include processing of telemetry data. A building may include various sensors within the building system, such as fire sensors, smoke sensors, intrusion and/or access sensors, monitoring sensors, closed circuit television (CCTV), among others, which can capture information which can be stored as data. Such data may be transmitted to the system 100 for processing and/or analysis. For example, data from smoke sensors in a building may be transmitted to the system 100 for processing and/or analysis as a workload by pod 106-1.

Although a workload is described above as including processing and/or analysis of telemetry data from a building management system, embodiments are not so limited. For instance, as another example, an airport may generate data related to flight management systems, weather stations, air traffic control information, etc. Such data may be transmitted to the system 100 as a workload by pod 106-P for processing and/or analysis. Accordingly, workloads can varied and diverse, ranging across many different types of industries.

As illustrated in FIG. 1, the system 100 further includes a database 110. The database 110 can be, for example, a PostgreSQL database operating within the Kubernetes environment. The database 110 can include (e.g., be a collection of) data associated with backup, shutdown, and restart sequences described herein.

Additionally, the system 100 can further include an API 112. The API 112 can be an interface for various computing applications to communicate with each other. For example, the API 112 can receive exemption requests for workloads, as is further described in connection with FIG. 3.

As mentioned above, such workloads may vary according to time. For instance, in an example in which a building access system runs as a workload on pod 106-1, the building access system as a workload may not be required to be run over a weekend, as building access is restricted during the weekend. The computing device 108 can determine whether a backup of the workload on the pod 106-1 exists in the database 110, as is further described in connection with FIG. 2.

In response to determining the backup of the workload exists, the computing device 108 can cause a shutdown sequence of the workload to occur at a first predetermined time to shut down the workload in the distributed computing environment, as is further described in connection with FIG. 3. For example, the first predetermined time can be a time on Friday evening, at which point the computing device 108 can cause the shutdown sequence of the workload to occur so that the building access system is not running as a workload on the pod 106-1 over the weekend. The shutdown sequence can be completed for the workload in response to an exemption not existing for the workload, as is further described in connection with FIG. 3.

Further, at a second predetermined time that is after the first predetermined time, and after the shutdown sequence has been successfully completed, the computing device 108 can cause a restart sequence of the workload to occur, as is further described in connection with FIG. 4. The restart sequence can restart the workload in the distributed computing environment. For example, at the second predetermined time, such as early Monday morning, the computing device 108 can cause the workload to restart so that the building access system restarts as a workload running on pod 106-1 for the coming week. As mentioned above, the backup sequence, the shutdown sequence, and the restart sequence are further described in connection with FIGS. 2, 3, and 4, respectively.

Figure 2:
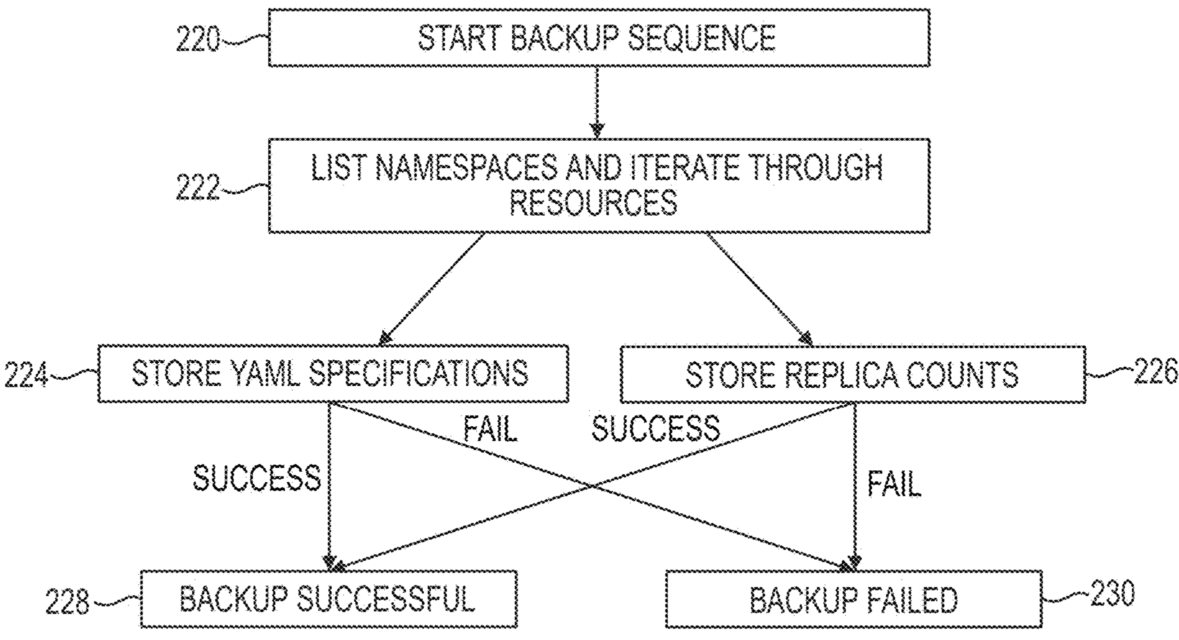
FIG. 2 illustrates an example of a method for a backup sequence for shutdown and restart management in a distributed computing environment in accordance with one or more embodiments.

FIG. 2 illustrates an example of a method for a backup sequence for shutdown and restart management in a distributed computing environment in accordance with one or more embodiments. The method can be performed by, for example, computing device 108 of the distributed computing environment, previously described in connection with FIG. 1.

As previously mentioned in FIG. 1, the computing device can cause a backup sequence to occur. For example, at 220, the method includes starting a backup sequence to generate a backup of a workload in a distributed computing environment. The computing device can generate a backup of the workload and save the backup to the PostgreSQL database (e.g., database 110 of FIG. 1) in the Kubernetes environment, as is further described herein.

At 222, the method includes iterating through resources in the distributed computing environment to list a number of namespaces in the distributed computing environment. A namespace in the distributed computing environment can be a mechanism to isolate computing resources within a cluster. Namespaces can, therefore, be utilized to assist various groups (e.g., different teams, projects, business units, etc.) that share a cluster. Accordingly, the computing device can iterate through the nodes of the cluster to list the number of namespaces in the cluster to determine where workloads are isolated within the cluster.

At 224, the method includes storing YAML Ain't Markup Language (YAML) specifications of the number of namespaces. For example, the computing device can store the namespaces in the cluster in a YAML specification file type in the PostgreSQL database. Additionally, at 226, the method includes storing replica counts associated with the resources in the distributed computing environment in the PostgreSQL database. A replica can be a copy of a pod. For example, if a workload utilizes computing power greater than that provided by a single pod, replicas of the pod may be provided in order to provide further computing resources for the workload. Accordingly, generation of the backup can include determining the replica counts for the workload. As such, the replica counts are further stored in the PostgreSQL database as part of the backup.

At 230, the method includes generating an alert indicating the backup sequence failed in response to the YAML specification and/or the replica counts not being successfully stored in the PostgreSQL database. However, at 228, if the YAML specification and the replica counts are successfully stored in the PostgreSQL database, an alert indicating the backup sequence is successfully generated and ready to be utilized during the restart sequence, as is further described in connection with FIG. 4, is generated. Accordingly, the computing device can begin a shutdown sequence of the workload, as is further described in connection with FIG. 3.

Figure 3:
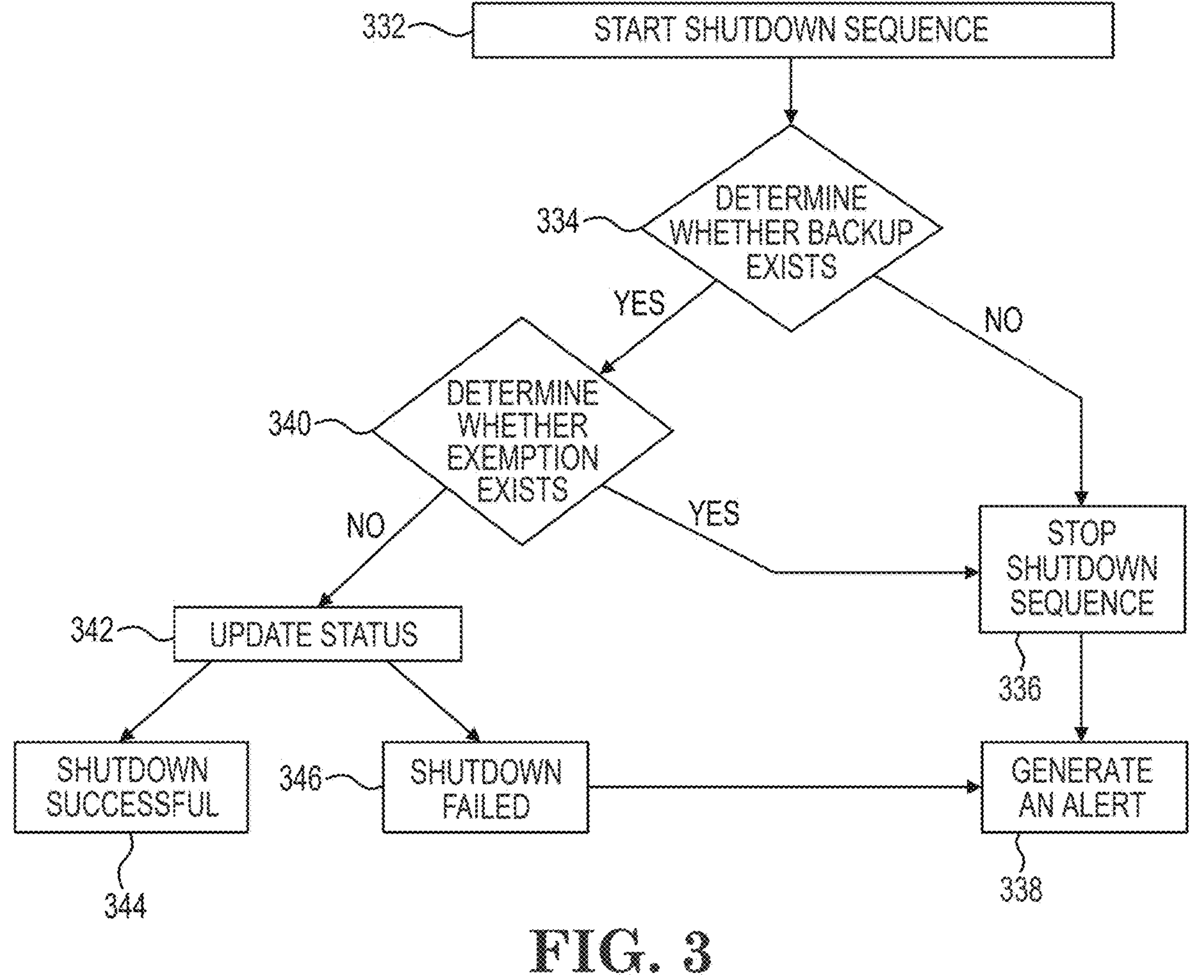
FIG. 3 illustrates an example of a method for a shutdown sequence for shutdown and restart management in a distributed computing environment in accordance with one or more embodiments.

FIG. 3 illustrates an example of a method for a shutdown sequence for shutdown and restart management in a distributed computing environment in accordance with one or more embodiments. The method can be performed by, for example, computing device 108 of the distributed computing environment, previously described in connection with FIG. 1.

At 332, the method includes starting the shutdown sequence of a workload of the distributed computing environment. As mentioned above, shutting down the workload during certain time periods (e.g., scheduling the shutdown for specific days) can allow for cost savings by utilizing less computing resources in the distributed computing environment as compared with previous approaches. The shutdown sequence can be started at a first predetermined time. For example, the first predetermined time can be at 8:00 PM on a Friday evening. Further a notification of the scheduled shutdown can be sent to users who may be affected by the shutdown via email, a scheduling application, etc.

At 334, the method includes determining whether a backup of the workload in the distributed computing environment exists. Utilizing a backup can allow for fast and efficient restarting of the workload in the restart sequence, as is further described in connection with FIG. 4.

To determine whether the backup of the workload exists, the computing device can poll the PostgreSQL database. As previously described in connection with FIG. 2, a recent backup can be created through a backup sequence and can be saved in the PostgreSQL database in the distributed computing environment.

At 336, the method includes stopping the shutdown sequence in response to a backup of the workload not existing in the PostgreSQL database. If the backup of the workload does not exist, the shutdown sequence can be stopped to avoid lengthy manual restart processes for the workload to restore the workload. In response to a backup of the workload not existing, the computing device can further generate and transmit an alert at 338 indicating the shutdown sequence has failed. The alert can be transmitted to a mobile device, a remote computing device, etc. in order to alert a user, such as an administrator or other on-call personnel, that the shutdown sequence has failed. Such an alert can, in some examples, include a severity level to indicate to the user that the alert is a high priority alert. The alert can inform the user the shutdown sequence has failed and service may be needed, and the severity level can indicate to the user the high-priority to address the failure of the shutdown sequence.

However, in response the computing device determining the backup for the workload exists, the computing device can continue the shutdown sequence at 340. At 340, the method includes determining whether an exemption exists for the workload. As used herein, an exemption refers to a policy allowing for a state of an object to be free from an obligation imposed on other objects. For example, an exemption can allow for a workload to not be subject to the shutdown sequence. Exemptions can provide for flexibility when workloads are business critical and should be kept on and not shut down. For example, workloads which may be subject to load testing, workloads that should be kept running over a weekend, etc. may be granted exemptions. Exemptions can be saved in the PostgreSQL database in the distributed computing environment. The computing device can determine whether an exemption exists for the workload by polling the PostgreSQL database (e.g., polling a list of exemptions included in the database). Exemptions can be received by the computing device, granted, or rejected via a separate protocol, as is further described herein.

For example, as previously described in connection with FIG. 1, the distributed computing environment can include an API. The computing device can receive an exemption request for an exemption for a workload via the API. The exemption request can include information related to the workload for which the exemption is being requested, contact details for the user submitting the exemption request (e.g., team name, project name, business unit, particular user information, etc.), in some examples the length of the exemption, etc. The user may utilize a portal through which an exemption request can be submitted.

In some examples, exemption requests may be automatically granted or rejected. For example, the computing device can automatically grant and generate an exemption in response to receiving the exemption request where the exemption is valid for a predetermined period of time. The predetermined period of time may be, for instance, two shutdown periods. For example, the shutdown period (e.g., the period of time between the first predetermined time at which the shutdown sequence is performed and the second predetermined time at which the restart sequence is performed) can be a weekend, and the exemption can be automatically granted so that the computing device generates the exemption that is valid for two weekends. The computing device can save the generated exemption in the PostgreSQL database.

In some examples, the computing device can automatically deny an exemption in response to the exemption request. For example, the exemption request may include a request for exemption for a workload having attributes that do not allow for an exemption to be granted for the workload. For instance, the workload may have already received an exemption in the past. In such an example, the computing device can automatically deny the exemption request.

Although exemption requests are described above as being automatically granted or denied, embodiments are not so limited. In some examples, the computing device can receive an exemption request and a user can review the exemption request. The computing device can receive a user input approving the exemption request or denying the exemption request. In response to the user input approving the exemption request, the computing device can save the exemption in the PostgreSQL database. However, in response to the user input denying the exemption request, the computing device can delete the exemption request.

At 336, in response to determining an exemption exists for the workload, the method includes stopping the shutdown sequence to refrain from shutting down the workload. Accordingly, the workload can be run during the shutdown period. In some examples, at 338 the method can include generating and transmitting an alert in response to the shutdown sequence not being completed. The alert may be transmitted to a mobile device, remote computing device, etc. to notify a user that a particular workload did not shut down because of an exemption existing.

However, in response to determining no exemption exists for the workload, the computing device can continue to shut down the workload. To shut down the workload, the computing device can execute a goroutine utilizing parallel processing in the Kubernetes environment, for example. The goroutine can be a lightweight thread managed by the Go runtime in the Kubernetes environment, and can allow for concurrent and efficient execution of the shutdown of the workload.

At 342, the method includes updating a status of the workload, including, for instance, an annotation of the workload. An annotation includes metadata associated with the pod that describes exemption-related information about the pod. For example, the pod can include an annotation attached to the pod in the form of metadata. The computing device can update information in the annotation, including exempted status, time constraints for the exemption, contact information for the entity that requested the exemption, etc. The annotation of the workload can also be saved in the PostgreSQL database.

In an example in which the annotation of the workload does not match the annotation information in the PostgreSQL database, the method can include determining the shutdown sequence has failed at 346. The computing device can stop the shutdown sequence if the annotation for the workload does not match the annotation information in the PostgreSQL database, which may indicate tampering.

At 344, the method includes determining the shutdown sequence of the workload was successful. In some examples, the computing device can generate and transmit an alert in response to the shutdown sequence being successful. The alert may be transmitted to a mobile device, remote computing device, etc. to indicate to a user that the workload was successfully shut down.

According to the shutdown sequence described above, the workload can be shutdown at the first predetermined time. The workload can be shut down for a shutdown period and can then be restarted at a second predetermined time, as is further described in connection with FIG. 4.

Figure 4:
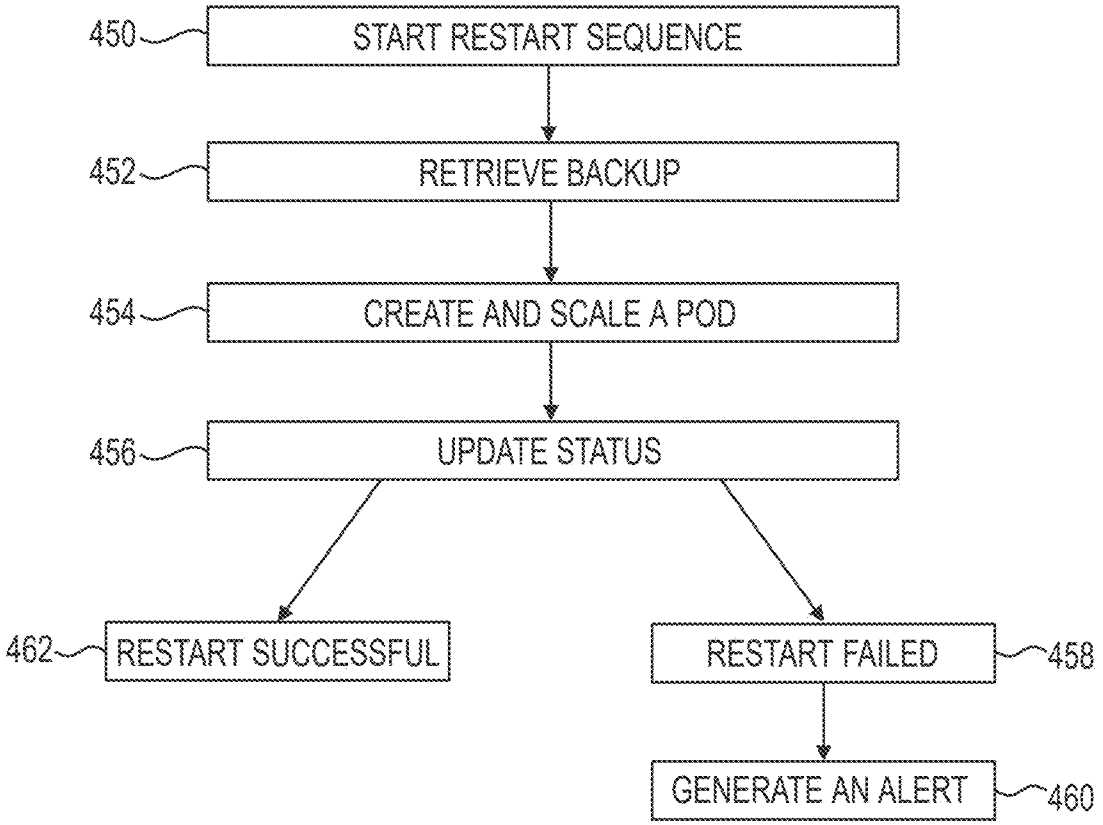
FIG. 4 illustrates an example of a method for a restart sequence for shutdown and restart management in a distributed computing environment in accordance with one or more embodiments.

FIG. 4 illustrates an example of a method for a restart sequence for shutdown and restart management in a distributed computing environment in accordance with one or more embodiments. The method can be performed by, for example, computing device 108 of the distributed computing environment, previously described in connection with FIG. 1.

After the shutdown period (e.g., the period of time between the first predetermined time at which the shutdown sequence is performed and the second predetermined time at which the restart sequence is performed) expires, the method can include starting, at 450, the restart sequence for the workload. For example, at the second predetermined time (e.g., Monday morning at 3:00 AM), which is after the first predetermined time (e.g., Friday evening at 8:00 PM) and after the shutdown sequence has been successfully completed, a restart sequence of the workload can be started to restart the workload in the distributed computing environment.

At 452, the method includes retrieving the backup of the workload from the PostgreSQL database. As previously described in connection with FIG. 2, the computing device can cause the restart sequence to occur by retrieving the backup from the PostgreSQL database, where the backup includes the namespaces in the YAML specification and replica counts for the workload.

At 454, the method includes recreating and scaling resources (e.g., a pod) in the distributed computing environment for (e.g., to run) the workload based on the backup of the workload. For example, the computing device can create a pod according to the YAML specification and scale up the pod to previous configurations with replicas (if they exist) according to the replica count to run the workload according to the backup.

At 456, the method includes updating a status of the workload. The computing device can update information in the annotation of the workload for the status, including exempted status, time constraints for the exemption, contact information for the entity that requested the exemption, etc. The annotation of the workload can also be updated in the PostgreSQL database. At 458, if the computing device determines the restart has not been successfully completed (e.g., failed), the method can include generating, at 460, an alert to notify a user that the restart sequence has failed. The alert can be transmitted to a mobile device, a remote computing device, etc. in order to alert a user, such as an administrator or other on-call personnel, that the restart sequence has failed. Such an alert can, in some examples, include a severity level to indicate to the user that the alert is a high priority alert. The alert can inform the user the restart sequence has failed and service may be needed, and the severity level can indicate to the user the high-priority to address the failure of the restart sequence. However, if, at 462, the computing device determines that the restart sequence was successful, the workload can again be run.

Although a single workload in the distributed computing environment is described above as having a backup generated, being shut down at a first predetermined time, and being restarted at second predetermined time, embodiments are not so limited. For example, the methods described herein may be applied to multiple workloads within a distributed computing environment.

Figure 5:
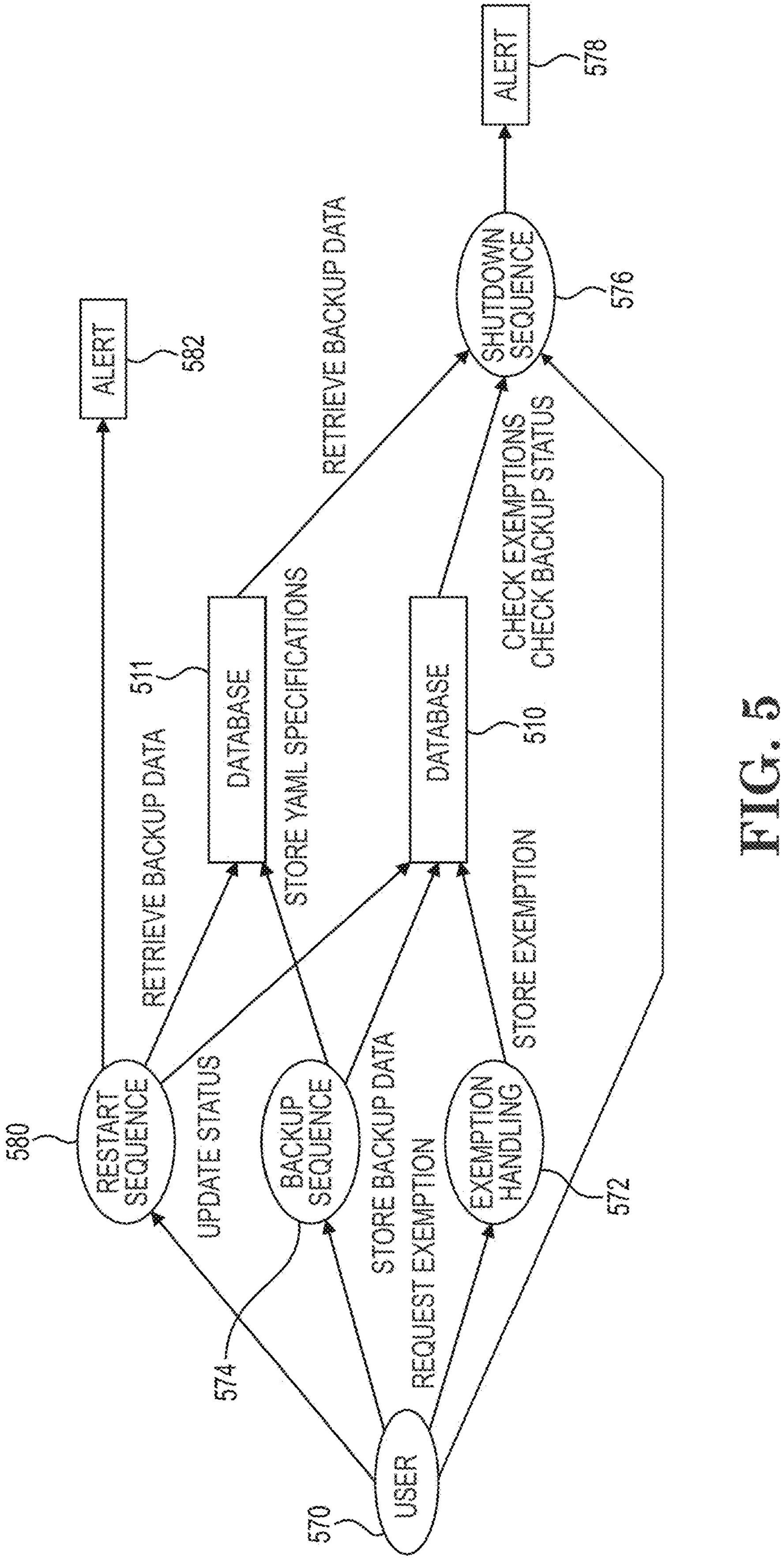
FIG. 5 illustrates an example of a method for shutdown and restart management in a distributed computing environment in accordance with one or more embodiments.

FIG. 5 illustrates an example of a method for shutdown and restart management in a distributed computing environment in accordance with one or more embodiments. The method can be performed by, for example, computing device 108 of the distributed computing environment, previously described in connection with FIG. 1.

At 570, a user can submit an exemption request for an exemption for a workload. The computing device can handle the exemption request at 572 by generating an exemption in response to the exemption request. The exemption can be valid for a predetermined period of time, such as 2 days. The computing device can store the exemption in a database 510.

At 574, the computing device can cause a backup sequence to occur to generate a backup of a workload in the distributed computing environment. The computing device can cause the backup sequence to occur by iterating through resources in the distributed computing environment to list a number of namespaces in the distributed computing environment. The computing device can store YAML specifications of the number of namespaces and replica counts associated with the resources in the distributed computing environment in the database 511. Although not illustrated in FIG. 5, the computing device can generate, in response to the YAML specifications and the replica counts being successfully stored in the database 511, an alert indicating the backup sequence was successful.

At 576, the computing device can cause a shutdown sequence of the workload to occur. In response to determining a backup of the workload exists in the database 511, the computing device can cause the shutdown sequence of the workload to occur at a first predetermined time to shut down the workload in the distributed computing environment.

During the shutdown sequence, the computing device can determine whether an exemption exists for the workload by polling the database 511. If an exemption exists for the workload in the database 510, the computing device can stop the shutdown sequence. If an exemption does not exist for the workload in the database 510, the computing device can continue to shut down the workload in the distributed computing environment. At 578, the computing device can transmit an alert indicating the shutdown sequence has failed if a backup of the workload does not exist in the database 511.

At 580, the computing device can cause a restart sequence of the workload to occur to restart the workload in the distributed computing environment. The computing device can cause the restart sequence to occur at a second predetermined time that is after the first predetermined time, and after the shutdown sequence has been successfully completed.

The restart sequence includes retrieving the backup of the workload from the database 511. The computing device can recreate and scale resources (e.g., a pod) in the distributed computing environment to run the workload based on the backup of the workload. At 582, the computing device can transmit an alert in response to the restart sequence not being successfully completed.

Although two databases 510 and 511 are illustrated in FIG. 5, embodiments are not so limited. For instance, in some examples, a single database 510 can exist, and exemptions, backup data, and YAML specifications may also be stored in the database 510.

One further example of a workload executing in a distributed computing environment may be an application that is executing on a pod in the distributed computing environment that employees may use during the week. For example, the application may be utilized by employees at an organization that manages workflow for a team.

Such an application may not be utilized during a weekend. The application can be shutdown over the weekend and restarted prior to the beginning of the workweek utilizing shutdown and restart management in a distributed computing environment as described herein.

For example, a computing device can cause a backup sequence for the workflow management application executing on a pod. The backup sequence can include iterating through resources in the distributed computing environment to list a number of namespaces in the distributed computing environment and can store YAML specifications of the number of namespaces and replica counts associated with the resources in the distributed computing environment in a PostgreSQL database in the distributed computing environment. An alert can be generated and transmitted if the backup sequence fails.

In order to shutdown the workflow management application (e.g., the workload), the computing device can initiate a shutdown sequence at a first predetermined time, such as 8:00 PM on a Friday. Initiation of the shutdown sequence can include determining by the computing device whether a backup of the workflow management application exists by polling the PostgreSQL database. If the backup of the workflow management application does not exist in the PostgreSQL database, the computing device can stop the shutdown sequence and generate and transmit an alert.

However, if the backup of the workflow management application does exist, the computing device can determine whether an exemption exists for the workflow management application. The exemption can exempt the workflow management application from being shut down. If the exemption exists for the workflow management application, the computing device can stop the shutdown sequence.

If the exemption does not exist, the computing device can update a status of the workflow management application by updating an annotation associated with the workflow management application. The computing device can update information in the annotation, including exempted status, time constraints for any exemption, contact information for the entity that requested an exemption, etc. The annotation of the workload can also be saved in the PostgreSQL database. A comparison of the annotation associated with the workflow management application can be made with the annotation saved in the PostgreSQL database. If the annotation in the PostgreSQL database matches the annotation associated with the workflow management application, the shutdown process can continue. However, if the annotation in the PostgreSQL database does not match the annotation associated with the workflow management application, the computing device can stop the shutdown sequence and generate and transmit an alert, as the mismatch may indicate tampering.

Accordingly, if the annotation in the PostgreSQL database matches the annotation associated with the workflow management application, the computing device can shut down the workflow management application running on the pod.

The workflow management application can be shut down over the weekend, and prior to the work week beginning, the workflow management application can be restarted.

For example, after the shutdown period, the computing device can initiate the restart sequence for the workflow management application at a second predetermined time, such as 3:00 am Monday morning, which is after the first predetermined time (e.g., 8:00 PM Friday evening). The restart sequence can include retrieving the backup of the workflow management application from the PostgreSQL database. Utilizing the backup, the computing device can recreate and scale a pod to run the workflow management application in the distributed computing environment. The pod can be created according to the YAML specification and scaled to previous configurations with replicas (if they existed) according to the replica count.

The computing device can update a status of the workflow management application by updating information in the annotation of the workflow management application and in the annotation in the PostgreSQL database. If the restart sequence has not been successfully completed, the computing device can generate and transmit an alert. However, if the restart sequence was successfully completed, the workflow management application can be again run in the distributed computing environment.

Another example of a workload executing in a distributed computing environment may be a database that is executing in a pod in the distributed computing environment that manages product orders.

Such a database may not be utilized during a weekend. The database can be shut down over the weekend and restarted prior to the beginning of the workweek utilizing shutdown and restart management in a distributed computing environment as described herein.

For example, a computing device can cause a backup sequence for the database executing on a pod. The backup sequence can include iterating through resources in the distributed computing environment to list a number of namespaces in the distributed computing environment and can store YAML specifications of the number of namespaces and replica counts associated with the resources in the distributed computing environment in a PostgreSQL database in the distributed computing environment. An alert can be generated and transmitted if the backup sequence fails.

In order to shutdown the database (e.g., the workload), the computing device can initiate a shutdown sequence at a first predetermined time, such as 8:00 PM on a Friday. Initiation of the shutdown sequence can include determining by the computing device whether a backup of the database exists by polling the PostgreSQL database. If the backup of the database does not exist in the PostgreSQL database, the computing device can stop the shutdown sequence and generate and transmit an alert.

However, if the backup of the database does exist, the computing device can determine whether an exemption exists for the database. The exemption can exempt the database from being shut down. If the exemption exists for the database, the computing device can stop the shutdown sequence.

If the exemption does not exist, the computing device can update a status of the database by updating an annotation associated with the database. The computing device can update information in the annotation, including exempted status, time constraints for any exemption, contact information for the entity that requested an exemption, etc. The annotation of the workload can also be saved in the PostgreSQL database. A comparison of the annotation associated with the database can be made with the annotation saved in the PostgreSQL database. If the annotation in the PostgreSQL database matches the annotation associated with the database, the shutdown process can continue. However, if the annotation in the PostgreSQL database does not match the annotation associated with the database, the computing device can stop the shutdown sequence and generate and transmit an alert, as the mismatch may indicate tampering.

Accordingly, if the annotation in the PostgreSQL database matches the annotation associated with the database, the computing device can shut down the database running on the pod. The database can be shut down over the weekend, and prior to the work week beginning, the database can be restarted.

For example, after the shutdown period, the computing device can initiate the restart sequence for the database at a second predetermined time, such as 3:00 am Monday morning, which is after the first predetermined time (e.g., 8:00 PM Friday evening). The restart sequence can include retrieving the backup of the database from the PostgreSQL database. Utilizing the backup, the computing device can recreate and scale a pod to run the database in the distributed computing environment. The pod can be created according to the YAML specification and scaled to previous configurations with replicas (if they existed) according to the replica count.

The computing device can update a status of the database by updating information in the annotation of the database and in the annotation in the PostgreSQL database. If the restart sequence has not been successfully completed, the computing device can generate and transmit an alert. However, if the restart sequence was successfully completed, the database can be again run in the distributed computing environment.

One further example of a workload executing in a distributed computing environment may be an application that is executing in a pod in the distributed computing environment that manages air traffic control information at an airport.

Such an application may be utilized often and users may not want to shut down such an application. Accordingly, certain applications can be exempted from the shutdown and restart management procedures as described herein.

A user associated with the air traffic control management application can submit an exemption request. The exemption can allow for certain business critical workloads to continue to be run. Upon submission and approval, an exemption can be saved in the PostgreSQL database.

Accordingly, the computing device can cause the backup sequence for the air traffic control management application executing on a pod to occur to generate and save a backup of the air traffic control management application in the PostgreSQL database.

The computing device can determine whether an exemption exists for the air traffic control management application. Accordingly, the computing device can determine the exemption exists for the air traffic control management application and stop the shutdown sequence.

Accordingly, shutdown and restart management in a distributed computing environment, as described herein, can allow for efficient management of shutdown and restart protocols in a distributed computing environment. These automated protocols can allow for workloads to be shut down during particular shutdown periods while also allowing for certain workloads to be exempt from the shutdown and restart sequences. Such an approach can allow for more efficient uses of resources in a distributed computing environment, while also ensuring integrity of data through backup processes and minimizing workload downtime, as compared with previous approaches.

Figure 6:
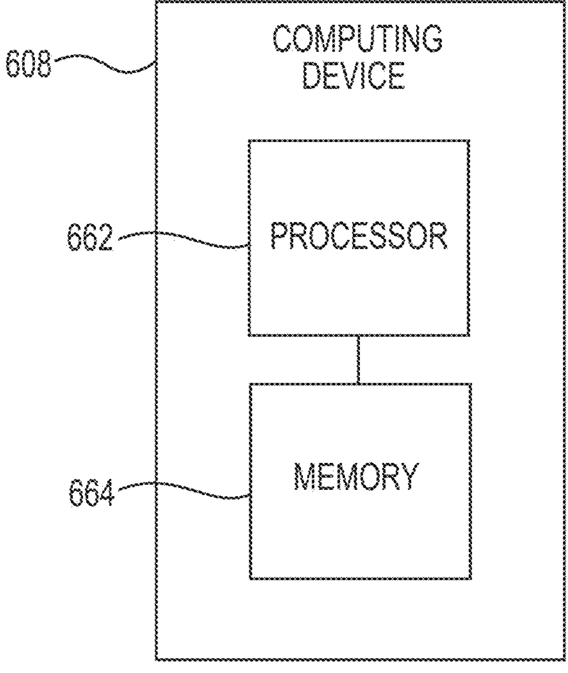
FIG. 6 is an example of a computing device for shutdown and restart management in a distributed computing environment in accordance with one or more embodiments.

FIG. 6 is an example of a computing device 608 for shutdown and restart management in a distributed computing environment, in accordance with one or more embodiments of the present disclosure. As illustrated in FIG. 6, the computing device 608 can include a memory 664 and a processor 662 for shutdown and restart management in a distributed computing environment, in accordance with the present disclosure.

The memory 664 can be any type of storage medium that can be accessed by the processor 662 to perform various examples of the present disclosure. For example, the memory 664 can be a non-transitory computer readable medium having computer readable instructions (e.g., executable instructions/computer program instructions) stored thereon that are executable by the processor 662 for shutdown and restart management in a distributed computing environment in accordance with the present disclosure.

The memory 664 can be volatile or nonvolatile memory. The memory 664 can also be removable (e.g., portable) memory, or non-removable (e.g., internal) memory. For example, the memory 664 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 664 is illustrated as being located within computing device 608, embodiments of the present disclosure are not so limited. For example, memory 664 can also be located internal to another computing resource (e.g., enabling computer readable instructions to be downloaded over the Internet or another wired or wireless connection).

The processor 662 may be a central processing unit (CPU), a semiconductor-based microprocessor, and/or other hardware devices suitable for retrieval and execution of machine-readable instructions stored in the memory 664.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for shutdown and restart management in a distributed computing environment, comprising:

determining, by a computing device, whether a backup of a workload in a distributed computing environment exists;

in response to determining the backup of the workload exists:

causing, by the computing device, a shutdown sequence of the workload to occur at a first predetermined time to shut down the workload in the distributed computing environment;

causing, by the computing device at a second predetermined time that is after the first predetermined time, and after the shutdown sequence has been successfully completed, a restart sequence of the workload to occur to restart the workload in the distributed computing environment;

determining, by the computing device during the shutdown sequence, whether an exemption exists for the workload; and in response to determining the exemption exists for the workload, initiating halting of the shutdown sequence to refrain from shutting down the workload.

2. The method of claim 1, wherein the method includes causing the shutdown sequence to continue to shut down the workload in response to determining no exemption exists for the workload.

3. The method of claim 1, wherein the method includes generating, by the computing device, an alert indicating a failure to initiate the shutdown sequence in response to determining the backup of the workload does not exist.

4. The method of claim 1, wherein the method includes generating, by the computing device, an alert in response to the restart sequence not being successfully completed.

5. The method of claim 1, wherein:

the method includes polling a database to determine whether the backup of the workload exists; and in response to the backup of the workload not existing in the database, the method includes refraining from initiating the shutdown sequence.

6. The method of claim 1, wherein the method includes receiving, by the computing device, an exemption request for an exemption for the workload.

7. The method of claim 6, wherein the method includes:

generating, by the computing device, an exemption in response to the exemption request, wherein the exemption is valid for a predetermined period of time; and saving, by the computing device, the exemption in a database.

8. The method of claim 6, wherein the method includes:

receiving, by the computing device, a user input approving the exemption request or denying the exemption request;

saving, by the computing device in response to the user input approving the exemption request, the exemption in a database; and deleting, by the computing device in response to the user input denying the exemption request, the exemption request.

9. A non-transitory computer readable medium storing instructions executable by a processing resource to cause the processing resource to:

cause a backup sequence to occur to generate a backup of a workload in a distributed computing environment;

cause the backup sequence to occur by iterating through resources in the distributed computing environment to list a number of namespaces in the distributed computing environment;

determine whether the backup of the workload in the distributed computing environment exists;

cause, in response to determining the backup of the workload exists, a shutdown sequence of the workload to occur at a first predetermined time to shut down the workload in the distributed computing environment; and cause, at a second predetermined time that is after the first predetermined time and after the shutdown sequence has been successfully completed, a restart sequence of the workload to occur to restart the workload in the distributed computing environment.

10. The non-transitory computer readable medium of claim 9, comprising instructions to store specifications of the number of namespaces and replica counts associated with the resources in the distributed computing environment in a database.

11. The non-transitory computer readable medium of claim 10, comprising instructions to generate, in response to the specifications and the replica counts being successfully stored in the database, an alert indicating the backup sequence was successful.

12. The non-transitory computer readable medium of claim 10, comprising instructions to generate, in response to the specifications and the replica counts not being successfully stored in the database, an alert indicating the backup sequence failed.

13. A computing device for shutdown and restart management in a distributed computing environment, comprising:

a processing resource; and a memory resource storing non-transitory machine-readable instructions to cause the processing resource to:

cause a backup sequence for a workload in a distributed computing environment to occur to generate a backup of the workload and save the backup to a database;

determine the backup of the workload exists in the database;

cause, in response to determining the backup of the workload exists in the database, a shutdown sequence of the workload to occur at a first predetermined time to shut down the workload in the distributed computing environment; and cause, at a second predetermined time that is after the first predetermined time and after the shutdown sequence has been successfully completed, a restart sequence of the workload to occur to restart the workload in the distributed computing environment;

determine, during the shutdown sequence, whether an exemption exists for the workload; and in response to determining the exemption exists for the workload, initiate stopping the shutdown sequence to refrain from shutting down the workload.

14. The computing device of claim 13, wherein the restart sequence includes retrieving the backup of the workload from the database.

15. The computing device of claim 13, wherein the restart sequence includes recreating and scaling resources in the distributed computing environment to run the workload based on the backup of the workload.

16. The computing device of claim 13, wherein the distributed computing environment is a Kubernetes environment.

17. The computing device of claim 16, wherein the workload is run on a pod in the Kubernetes environment.

* * * * *